Reissued July 9, 1935

Re. 19,632

UNITED STATES PATENT OFFICE 19,632

PROCESS FOR THE CATALYTIC SYNTHESIS OF AMINES FROM ALCOHOL AND AMMONIA

Herrick R. Arnold, Elmhurst, Del., assignor to E. I. du Pont de Nemours & Company, Wilmington, Del., a corporation of Delaware No Drawing. Original No. 1,799,722, dated April 7, 1931, Serial No. 297,116, filed August 2, 1928. Application for reissue filed March 22, 1933. Serial No. 662,085

24 Claims. (Cl. 260—127)

This invention relates to the production of amines, and more particularly to a method of controlling the type of amines produced.

The catalytic synthesis of amines has been performed by passing an alcohol vapor and anhydrous ammonia over a dehydrating catalyst, resulting in the production of mixtures of the corresponding primary, secondary and tertiary amines. It often happens, however, that only certain amines are desired but, owing to the fact that there was no known way of controlling the synthesis so as to secure the production of the desired amine only, the yield of the desired amine was often poor and the cost therefore high.

It is therefore an object of this invention to provide an improved process for the catalytic synthesis of amines from alcohols and ammonia, which enables the reaction to be directed selectively so that the formation of an undesired amine may be inhibited.

It is another object of this invention to provide an improved process for the catalytic synthesis of amines from alcohols and ammonia, which enables the reaction to be directed selectively to the formation of any one of the mono-, di-, or tri-amines desired, at the same time inhibiting nearly or entirely the formation of the other two.

With the above and other objects in view, which will be apparent as the description proceeds, I have set forth my invention in the following specification and have indicated certain specific embodiments of my invention by way of illustration and not as a limitation.

It has been found that given the optimum conditions of pressure, temperature, and space velocity, the molecular ratio of alcohol to ammonia is the most important factor influencing yield, and proportion of primary, secondary, and tertiary amines in the product. As this ratio is increased the total conversion increases. At low ratios, c. g., 1 to 4, primary amine is the major product, while at a ratio of about 3 to 1 primary amine disappears, the product consisting of secondary and tertiary amines, tertiary being formed in the larger amounts.

According to my invention, secondary amine may be formed selectively and nearly to the exclusion of the other two by operating with a high ratio of alcohol to ammonia, thus eliminating the formation of primary amine, and inhibiting formation of tertiary amine by passing a certain amount of this product over the catalyst with the alcohol. The equilibrium is thus shifted in the direction of secondary amine formation, resulting in a product consisting almost entirely of secondary amine.

The selective formation of primary amine is accomplished by operating at a very low ratio of alcohol to ammonia, and recirculating any secondary or tertiary amine produced, with the result that the product consists almost entirely of the primary compound.

The selective formation of tertiary amine is accomplished by operating at a high ratio of alcohol to ammonia and recirculating any lower amines produced, with the result that the product consists almost entirely of the tertiary compound.

Although any desired dehydration or amination catalyst, such as alumina or thoria, may be used in this process, I prefer alumina prepared in gel form by the hydrolysis of aluminum ethoxide in aqueous ethyl alcohol solution as follows:

A saturated solution of aluminum ethoxide in absolute ethyl alcohol is prepared by boiling under a reflux condenser. After cooling, the clear solution is decanted or filtered from the excess ethoxide or alumina and the solution is then poured rapidly into an equal volume of ethyl alcohol containing 2% of water by volume. The mixture sets to a gel in 1 to 2 minutes, after which it is allowed to stand in the air for several days or until no more alcohol is squeezed out. Considerable shrinkage occurs during this period, the alcohol which comes out being drawn off from time to time. The gel is then dried out slowly over a period of about three days, starting at about 50° C. and increasing the temperature gradually to about 110° C. After drying the gel is roasted at 500° to 600° C. for eight hours by which time it has acquired the form of very hard, clear granules. The catalyst is then ready for use after screening to a convenient size, preferably 8 to 14 mesh.

*Example 1*

Absolute methanol at the rate of 0.75 to 1.5 cc. per cc. of catalyst per hour, together with sufficient anhydrous ammonia to give a molecular ratio of methanol to ammonia of 3 to 4 methanol to 1 of ammonia, is preheated to 300° to 350° C., and passed over an alumina gel catalyst heated to 400° to 500° C., the preferred temperature being 450° C. Under these conditions an initial conversion to total amines of 85% of the ammonia input is obtained, of which 57% is tertiary amine and 28% secondary, with no primary. The tertiary amine is then separated from the secondary by distillation and recirculated over the catalyst with fresh methanol and ammonia, after which only about 8% of tertiary is formed, the conversion to secondary being from 45 to 50% of the ammonia.

*Example 2*

Monomethylamine is formed with only traces of di- and tri-methylamine, by passing methanol and ammonia, in the ratios of from 1:1 to 1:5 over alumina gel, at a rate similar to that used in Example 1. The vapors are preheated to about 350° C. and the catalyst is kept at 450° C. About 13.5% of the ammonia is thus converted to primary amine, secondary and tertiary amines being formed in amounts representing 7.5 and 10.5% respectively of the ammonia. The secondary and tertiary amines are then separated from the primary amine and recirculated over the catalyst with fresh methanol and ammonia, thus increasing the proportion of primary amine and materially decreasing the proportion of secondary and tertiary amines present.

*Example 3*

If it is desired to control the process of the synthesis of amines so as to obtain tertiary amines as a major constituent, this can be done by operating at a high ratio of methanol to ammonia. Methanol and ammonia in the ratio of 3 to 1 are passed over alumina gel at 450° C. and a space velocity of 1 cc. per cc. of catalyst per hour, producing a conversion of ammonia to methylamines of about 85%. This product consists of secondary and tertiary amines in the ratio of about 1 to 2, representing conversions of about 28% and 57%, respectively. Only traces of primary amine are formed. By recirculating the secondary amine the further production of secondary amine is inhibited and the relative proportion of tertiary amine is increased.

This invention is applicable to the synthesis of aliphatic amines such as methyl, ethyl or butyl amines; to the aromatic amines such as aniline, the toluidines or benzyl-amine; and to mixed alkyl-arylamines such as monomethyl, dimethyl, monoethyl or diethyl aniline.

It will therefore be apparent that I have invented a new and useful method of making amines in which the production of an undesired amine or amines is inhibited by adding the undesired amine or amines to the reaction mixture.

As many apparently widely different embodiments of this invention may be made without departing from the spirit and scope thereof, it is to be understood that I do not limit myself to the specific embodiments thereof except as defined in the appended patent claims.

I claim:

1. In the process of making amines by the catalytic synthesis in the vapor phase of primary alcohols and ammonia, the method of controlling the relative quantities of primary, secondary and tertiary amines produced which consists in adding the undesired material to the reaction mixture to inhibit the production of said undesired material.

2. The process of claim 1 in which the catalyst is an alumina gel.

3. The process of making amines by the catalytic synthesis in the vapor phase from primary alcohols and ammonia, which consists in adding amines having a higher degree of alkylation than a given amine to decrease the relative proportion of said amines having a higher degree of alkylation than a given amine produced and to increase the relative proportion of said given amine produced.

4. The process of making amines by catalytic synthesis in the vapor phase primary alcohols and ammonia in which the formation of tertiary amine is inhibited by passing tertiary amine over an amination catalyst with the alcohol and ammonia.

5. The process of making amines by catalytic synthesis in the vapor phase primary alcohols and ammonia in which a high ratio of alcohol to ammonia is used and in which the formation of tertiary amine is inhibited by passing tertiary amine over an amination catalyst with the alcohol and ammonia.

6. In the process of making aliphatic amines by catalytic synthesis in the vapor phase of primary aliphatic alcohols and ammonia, the method of controlling the relative quantities of primary, secondary and tertiary amines produced which consists in adding the undesired amine to the reaction mixture to inhibit the production of the undesired amine.

7. The process of making aliphatic amines by catalytic synthesis in the vapor phase of primary aliphatic alcohols and ammonia, which consists in adding amines having a higher degree of alkylation than a given amine to decrease the relative proportion of said amines produced and to increase the relative proportion of said given amine produced.

8. The process of making aliphatic amines by catalytic synthesis in the vapor phase of primary aliphatic alcohols and ammonia in which the formation of tertiary amine is inhibited by passing tertiary amine over an amination catalyst with the alcohol and ammonia.

9. The process of making aliphatic amines by catalytic synthesis in the vapor phase of primary aliphatic alcohols and ammonia in which a ratio of alcohol to ammonia of about three to one is used and in which the formation of tertiary amine is inhibited by passing tertiary amine over an amination catalyst with the alcohol and ammonia.

10. The process of making amines which consists in passing methanol and ammonia in the vapor phase over an amination catalyst to form a high proportion of secondary and tertiary amines relative to the quantity of primary amine formed, separating the tertiary amine from the secondary amine by distillation, and recirculating the tertiary amine over the catalyst with fresh methanol and ammonia.

11. The process of making amines which consists in passing methanol and ammonia in the vapor phase over an amination catalyst in the ratio of three to four parts of methanol to one part of ammonia to convert 85% of the ammonia into secondary and tertiary amines, separating the tertiary amine from the secondary amine by distillation, and recirculating the tertiary amine over the catalyst with fresh methanol and ammonia.

12. The process of claim 11 in which the methanol is passed over the catalyst at the rate of 0.75 to 1.5 cc. per cc. of alumina gel per hour, and in which the reaction mixture is preheated to 300° to 350° C. and the catalyst is heated to 400° to 500° C.

13. Process for the production of methylamine which comprises passing a gaseous mixture comprising one part methanol and about one to about five parts ammonia at a temperature of about 400° to about 500° C. over metallic oxide dehydrating catalysts.

14. Process for the production of methylamine which comprises passing methanol with a molecular excess of ammonia at a temperature of about 400° to about 500° C. and at a space velocity of about .75 to about 1.5 cc. of absolute methanol per cc. of catalyst per hour over metallic oxide dehydrating catalysts.

15. Process for the production of methylamine which comprises passing a gaseous mixture comprising one part methanol and about one to about five parts ammonia at about 400° C. over metallic oxide dehydrating catalysts.

16. Process for the production of methylamine which comprises passing a gaseous mixture comprising one part methanol and about one to about five parts ammonia at about 400° C. and at a space velocity of about 1100 cc. of gaseous reactants per cc. of catalyst per hour over metallic oxide dehydrating catalysts.

17. A process for the production of methylamine, the steps which comprise passing a mixture of methanol with a molecular excess of ammonia at a temperature of about 400° to about 500° C. over catalysts comprising aluminium oxide.

18. In a process for the production of methylamine, the steps which comprise passing a mixture of methanol and ammonia at a temperature of about 400° to about 500° C. and at a space velocity of about .75 to about 1.5 cc. of absolute methanol per cc. of catalyst per hour over catalysts comprising aluminium oxide.

19. In a process for the production of methylamine, the steps which comprise passing a mixture of methanol and ammonia at about 400° C. and at a space velocity of about 1100 cc. of gaseous reactants per cc. of catalyst per hour over catalysts comprising aluminium oxide.

20. In a process for the production of methylamine, the steps which comprise passing a mixture of methanol and ammonia at a temperature of about 400° to about 500° C. over catalysts comprising dehydrated aluminium hydroxide.

21. In a process for the production of methylamine, the steps which comprise passing a mixture of methanol and ammonia at a temperature of about 400° to about 500° C. and at a space velocity of about .75 to about 1.5 cc. of absolute methanol per cc. of catalyst per hour over catalysts comprising dehydrated aluminium hydroxide.

22. In a process for the production of methylamine, the steps which comprise passing methanol and a molecular excess of ammonia at a temperature of about 400° to about 500° C. and at a space velocity of about .75 to about 1.5 cc. of absolute methanol per cc. of catalyst per hour over catalysts comprising dehydrated aluminium hydroxide.

23. In a process for the production of monomethylamine, the steps which comprise passing methanol and a molecular excess of ammonia at a temperature of about 400° to about 500° C. and at a space velocity of about .75 to about 1.5 cc. of absolute methanol per cc. of catalyst per hour over catalysts comprising dehydrated aluminium hydroxide.

24. Process for the production of methylamine which comprises passing methanol with a molecular excess of ammonia at temperatures ranging from 400° to 500° C. over metallic oxide dehydrating catalysts.

HERRICK R. ARNOLD.